(12) United States Patent
Miyake

(10) Patent No.: US 6,750,983 B1
(45) Date of Patent: Jun. 15, 2004

(54) IMAGE PROCESSING APPARATUS AND METHOD, AND STORAGE MEDIUM

(75) Inventor: Nobutaka Miyake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/535,545

(22) Filed: Mar. 27, 2000

(30) Foreign Application Priority Data

Mar. 30, 1999 (JP) .......................................... 11-090071

(51) Int. Cl.$^7$ .............................................. H04N 1/405
(52) U.S. Cl. ...................... 358/1.9; 358/3.03; 382/251; 382/270
(58) Field of Search .................... 358/1.9, 3.03, 358/443, 448; 382/251, 252, 254, 270

(56) References Cited

U.S. PATENT DOCUMENTS

| | | | |
|---|---|---|---|
| 5,331,429 A | 7/1994 | Levien | 358/456 |
| 5,499,111 A | 3/1996 | Sato et al. | 358/455 |
| 5,543,855 A | 8/1996 | Yamada et al. | 348/753 |
| 5,822,462 A | 10/1998 | Miyake | 382/251 |
| 5,875,248 A * | 2/1999 | Lewis | 380/54 |

FOREIGN PATENT DOCUMENTS

| | | |
|---|---|---|
| EP | 0451722 | 10/1991 |
| EP | 0540177 | 5/1993 |
| EP | 0551016 | 7/1993 |
| EP | 0 707 419 | 4/1996 |
| EP | 0766468 | 4/1997 |
| EP | 0855681 | 7/1998 |
| GB | 2326048 | 12/1998 |
| JP | 2-210961 | 8/1990 |
| JP | 11-018109 | 1/1999 |
| JP | 11-252573 | 9/1999 |

* cited by examiner

Primary Examiner—Thomas D. Lee
(74) Attorney, Agent, or Firm—Fitzpatrick, Cella, Harper & Scinto

(57) ABSTRACT

A texture which is not normally generated by a pseudo halftone process is artificially generated by combining quantization values (S307, S308), and a 1-bit code is expressed by the presence/absence of texture.

19 Claims, 16 Drawing Sheets

FIG. 4A

| A | B | C |
|---|---|---|
| D | E | * |

FIG. 4B

| 0 | 0 | 0 |
|---|---|---|
| 0 | 1 | * |

FIG. 8A

|   | B |   |
|---|---|---|
| A | D |   |
| C | E | F |
|   | H |   |
| G | * |   |

FIG. 8B

|   | 0 |   |
| - | 0 |   |
| 0 | 0 | 0 |
|   | 1 |   |
| 0 | * |   |

FIG. 8C

|   | 0 |   |
| 0 | 1 |   |
| 0 | 0 | 0 |
|   | - |   |
| - | * |   |

IMAGE PROCESSING APPARATUS AND METHOD, AND STORAGE MEDIUM

FIELD OF THE INVENTION

The present invention relates to an image processing apparatus and method, and a storage medium.

BACKGROUND OF THE INVENTION

Conventionally, the studies for multiplexing, onto image information, another information that pertains to an image have been extensively made.

In recent years, a technique called digital watermarking, which multiplexes, onto image information such as a photo, painting, or the like, additional information including the copyright holder name, permission/denial of use, and the like so as to be hard to visually detect, and distributes such information via a network such as the Internet or the like, has prevailed.

As another application field of such technique, as image forming apparatuses such as copying machines, printers, and the like attain higher image qualities, a technique for embedding additional information into an image to specify the output device model and model number from the image output onto a recording sheet for the purpose of preventing securities such as banknotes, revenue stamps, and the like from being forged is known.

For example, a technique for multiplexing information by embedding additional information in the high-frequency range of color difference and saturation components with low visual sensitivity has been proposed.

However, the conventional multiplexing technique suffers the following problems.

FIG. 16 illustrates the conventional additional information embedding method. As shown in FIG. 16, image information A and additional information B are multiplexed via an adder 1601 to generate multiplexed information C. The adder 1601 may add information in the real space of the image information A or may transform the image information A into that in the frequency domain using, e.g., Fourier transformation, or the like and may then synthesize the additional information B in the high-frequency range of the converted information.

If it is possible to distribute the multiplexed information C generated in this way without undergoing any image processes such as various filtering processes and the like or any encoding processes such as irreversible compression or the like, it is easy even for the conventional technique to decode the additional information B from the multiplexed information C. Also, image information, which is distributed on, e.g., the Internet, can also be decoded via digital filters for improving image quality such as edge emphasis, smoothing, and the like, as long as it has some noise resilience.

Assume that an image forming apparatus has only expression performance as low as two to several gray levels per color. In recent years, ink-jet printers can express several gray levels per color using inks with lower dye densities or by variably controlling the dot sizes to be output, but cannot express a photo-quality image unless a pseudo halftone process is used.

FIG. 17 illustrates an example that executes a pseudo halftone process upon conventional additional information multiplexing. That is, in addition to the arrangement shown in FIG. 16, the multiplexed information is converted into quantized information D by a pseudo halftone process 1701, and the converted information is printed out onto a recording sheet by a printer output 1702, thus obtaining printed information E that has deteriorated considerably.

Hence, decoding additional information from information on a recording sheet for the purpose of preventing forgery amounts to decoding additional information from the printed information E after the series of processes shown in FIG. 17. However, the image information changes to a large extent by the two processes, i.e., the pseudo halftone process 1701 and printer output 1702. Therefore, it is very difficult to multiplex additional information so as not to be visually detectable, and to normally decode the multiplexed additional information from information on a recording sheet.

In the aforementioned multiplexing technique, information is appended in the high-frequency range of an image. However, when the subsequent pseudo halftone process uses error diffusion, the frequency range of the additional information is buried under that of a texture produced by error diffusion due to the characteristics of a high-pass filter unique to error diffusion, and it becomes harder to decode the additional information. Also, in order to accurately decode the information, a scanner device with very high precision is required.

That is, when the pseudo halftone process must be done, the multiplexing method shown in FIG. 17 is not suitable. In other words, an additional information multiplexing method that fully utilizes the characteristics of the pseudo halftone process is needed.

Some examples that combine multiplexing of additional information and redundancy of the pseudo halftone process will be explained below.

As a first example, upon binarization using ordered dithering, additional data is mixed into an image signal by selecting one of dither matrices indicating an identical gray level. However, in ordered dithering, it is difficult to output a photo-quality image unless a printer having a high resolution and very high mechanical precision is used. Small mechanical precision errors are produced as low-frequency noise such as horizontal stripes or the like, and are easily visually detectable on the paper. When the dither matrices are periodically changed, a specific frequency range generated by a regular dither pattern is disturbed, thus adversely influencing image quality. Also, the decoder must decode by estimating the dither matrix used in binarization while pixel values of image information as an original signal are unknown and, hence, it is hard to attain accurate decoding.

As a second example, a method of multiplexing additional information using a color dither pattern method is known. In this method, deterioration of image quality upon switching the dither matrices cannot be avoided as in the above example. Compared to the first example, a larger number of pieces of additional information can be multiplexed, but color tincture changes since the layout of color components changes, and image quality deteriorates considerably in a solid portion. Also, decoding becomes more harder to attain.

In any case, these methods that change the dither matrices suffer the problem that decoding is hard to attain despite the fact that image quality deteriorates considerably.

SUMMARY OF THE INVENTION

The present invention has been made to solve the above-mentioned problems and has as its object to provide an image processing apparatus and method, which can multiplex additional information onto image information while suppressing deterioration of image quality, and can easily decode the additional information, and a storage medium.

In order to achieve the above object, according to a preferred embodiment of the present invention, there is provided an image processing apparatus for multiplexing additional information onto image information, comprising quantization means for quantizing a pixel of interest of the image information by a pseudo halftone process based on error diffusion, and control means for controlling a quantization value of the pixel of interest with quantization values of a plurality of pixels including the pixel of interest forming a specific pattern indicating the additional information.

For example, the specific pattern is a pattern which is not easily generated by the quantization means.

It is another object of the present invention to provide an image processing apparatus and method having a novel function, and a storage medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B show an example of a target pattern in the first embodiment;

FIGS. 8A to 8C show example of target patterns in the second embodiment;

DETAILED DESCRIPTION OF THE PREFERRED EMBODIMENTS

Preferred embodiments of the present invention will be described in detail hereinafter with reference to the accompanying drawings. Note that an image processing apparatus in each of the embodiments is efficiently implemented as a printer driver in a computer that creates image information to be output to a printer information, but may be effectively built in a copying machine, facsimile apparatus, printer main body, or the like as hardware or software.

Figure 1:
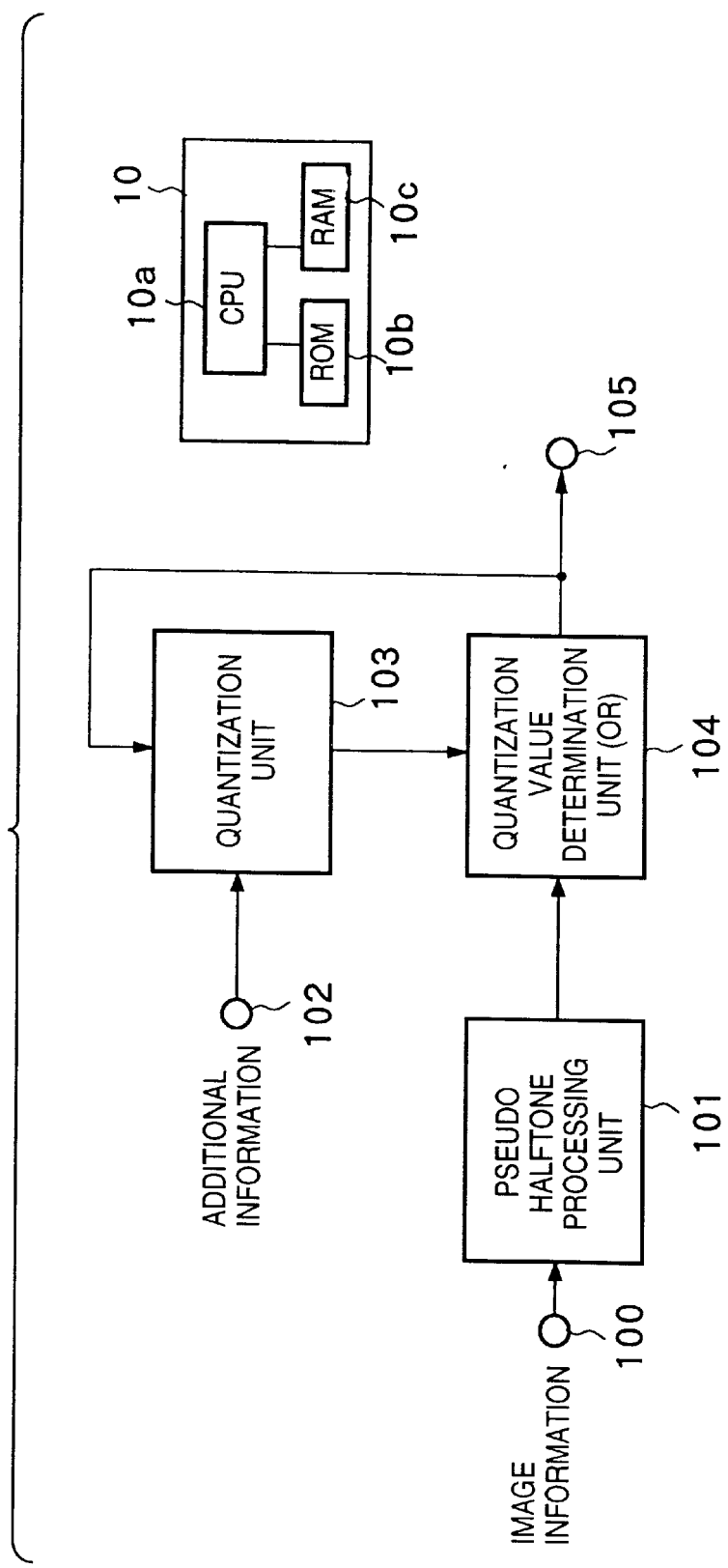
FIG. 1 is a block diagram showing a schematic arrangement of a multiplexer according to the first embodiment of the present invention.

FIG. 1 is a block diagram showing a schematic arrangement of a multiplexer in the first embodiment of the present invention.

Referring to FIG. 1, reference numeral 10 denotes a controller which includes a CPU 10$a$, ROM 10$b$, RAM 10$c$, and the like, and controls operations and processes of the individual building components to be described below. Especially, the CPU 10$a$ controls multiplexing and associated processes in accordance with programs pre-stored in the ROM 10$b$ using the RAM 10$c$ as a work memory.

Reference numeral 100 denotes an input terminal which inputs multi-level image information. Reference numeral 101 denotes a pseudo halftone processing unit which executes pseudo halftoning of image information input from the input terminal 100 to convert the information to quantization levels smaller than the number of input gray levels and to reproduce tone by dot area modulation using the quantization values of a plurality of pixels. Note that the pseudo halftoning in the pseudo halftone processing unit 101 will be described in detail later. Reference numeral 102 denotes an input terminal for inputting required additional information to be embedded in image information. The additional information may include various kinds of information that pertain to the output state upon outputting an image onto a recording sheet such as the manufacturer name, model name, machine number, and the like of an output device. Reference numeral 103 denotes a quantization unit for computing the quantization value of the pixel of interest with reference to the code of additional information and the quantization results of a plurality of pixels which have already been finally quantized. Note that the quantization method in the quantization unit 103 will be described in detail later.

Reference numeral 104 denotes a quantization value determination unit that determines a final quantization value on the basis of both the quantization value after pseudo halftoning in the pseudo halftone processing unit 101, and that after quantization in the quantization unit 103. This quantization result is sent to a printer engine via an output terminal 105 as a multiplexing result of additional information onto image information, and an image is formed on a recording sheet.

Figure 2:
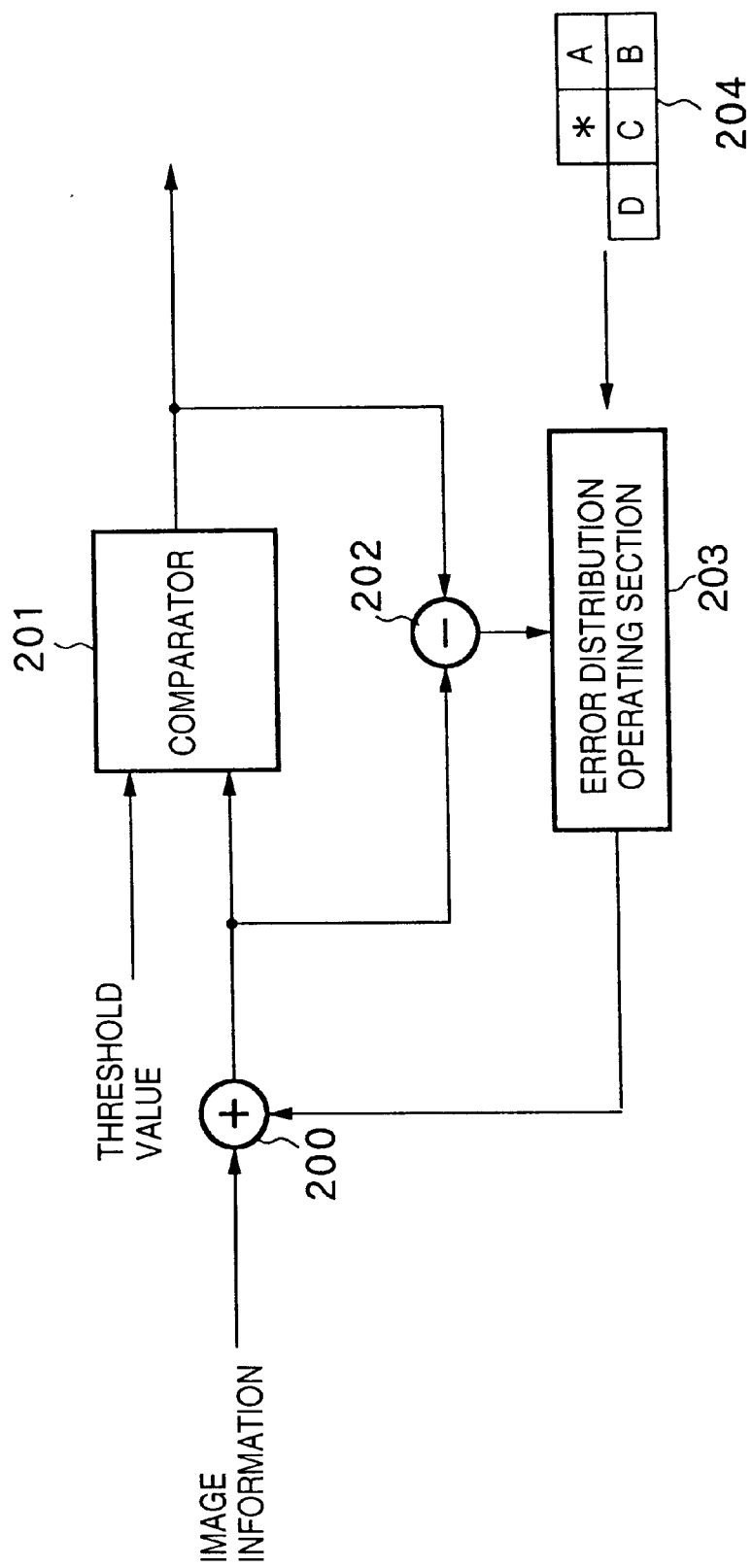
FIG. 2 is a block diagram showing a detailed arrangement of a pseudo halftone processing unit of the first embodiment.

FIG. 2 is a block diagram showing a detailed arrangement of the pseudo halftone processing unit 101. The pseudo halftone processing unit 101 executes pseudo halftoning using error diffusion. Since details of general error diffusion are known to those who are skilled in the art, a detailed description thereof will be omitted.

An error diffusion process in which the quantization value is a binary value will be exemplified below.

Referring to FIG. 2, reference numeral 200 denotes an adder, which adds the value of the pixel of interest of the input image information and a quantization error distributed from already binarized, surrounding pixels. The sum is compared with a threshold value set in advance by a comparator 201, and when the sum is larger than the threshold value, "1" is output; otherwise, "0" is output, thus quantizing the pixel value. When the gray level of a given pixel is expressed by, e.g., 8-bit precision, it is a common practice to express it using "255" as a maximum value and "0" as a minimum value. When the quantization value is "1", a dot (ink, toner, or the like) is printed on a recording sheet.

Reference numeral 202 denotes a subtractor which computes any error between the quantization result output from the comparator 201 and the sum output from the adder 200, and outputs the error to an error distribution operating section 203. The error distribution operating section 203 distributes the error to surrounding pixels which are to undergo quantization next. As the error distribution ratio, an error distribution table 204 which is experimentally set on the basis of relative distances to the pixel of interest is prepared in advance, and the error is distributed to the pixels on the basis of the distribution ratios in the distribution table 204.

Figure 3:
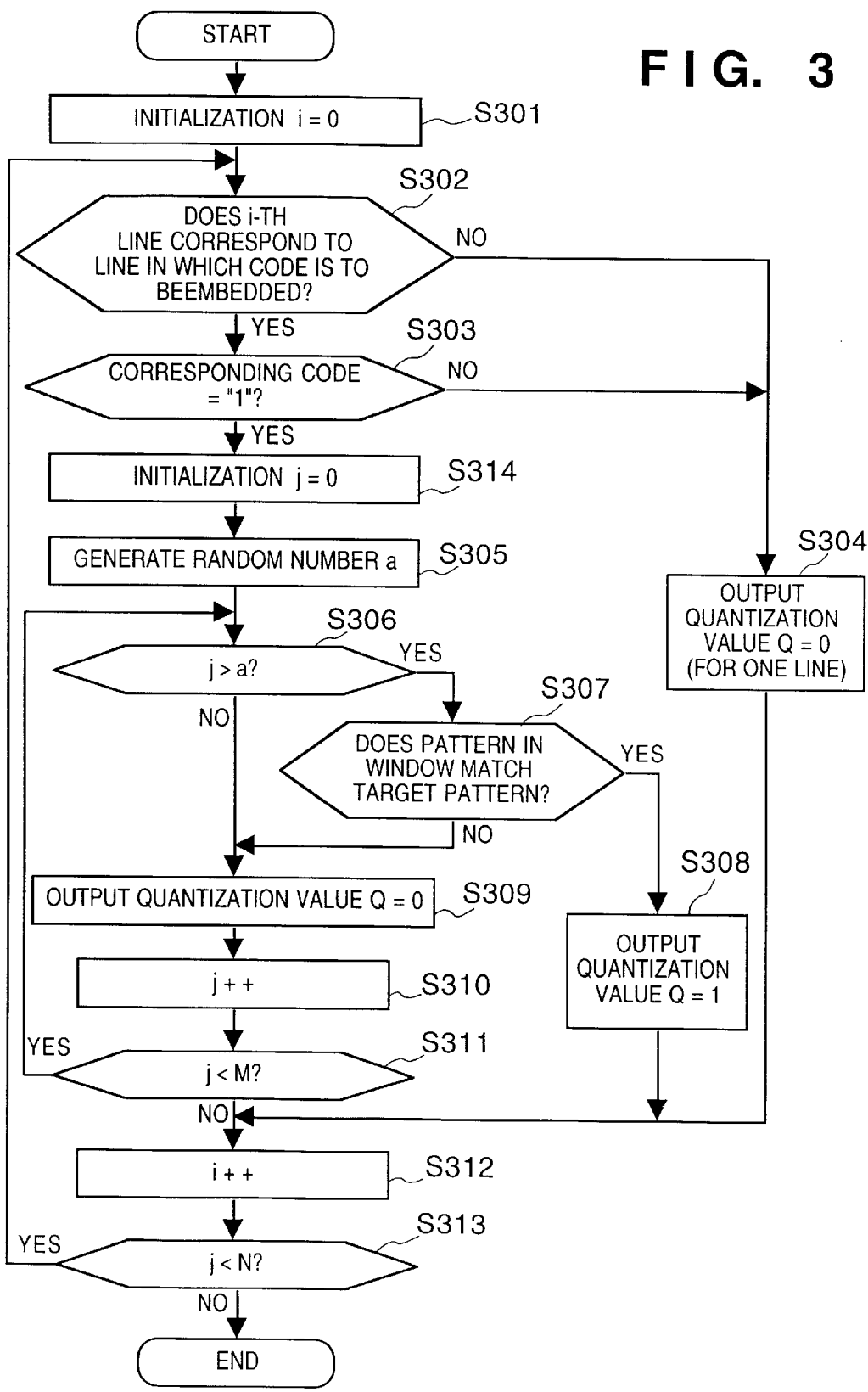
FIG. 3 is a flow chart showing a quantization process in the first embodiment.

The quantization unit 103 will be described in detail below. FIG. 3 is a flow chart showing the operation sequence for computing the quantization value in the quantization unit 103. A case will be exemplified below wherein additional information is embedded in a block consisting of N vertical pixels and M horizontal pixels in image information. Note that the quantization value is a binary value.

In step S301, variable i is initialized. Variable i counts the vertical address. In step S302, discrimination using the address value i is made, i.e., it is checked if address i indicates a line in which a code is to be embedded. Assuming that additional information for 40 bits is embedded in a block defined by N vertical pixels and M horizontal pixels, addresses for "40+α" lines of those for all N lines in the vertical direction of that block are used to embed codes. Note that α is required as marker codes and the like indicating the start and end of codes. In this case, rules indicating which "40+α" lines of the N lines are to be used must be recognized by both the encoder and decoder sides. For example, a rule for embedding codes every n-th lines or the like may be set. In this case, the value n is preferably large to some extent, so that embedded codes are not visually conspicuous.

In step S302, YES is determined "40+α" times in the N lines, and NO is determined remaining "N−(40+α)" times. If NO in step S302, quantization values Q="0" for one line are output in step S304. On the other hand, if YES in step S302, it is checked in step S303 if the code of interest is "1" or "0". In this embodiment, the information size to be embedded for one line in the block is 1 bit. If the code is "0", quantization values Q="0" for one line are output in step 5304, and the next line is selected in step S312.

On the other hand, if the code is "1", variable j which counts the horizontal address is initialized in step S314 and random number a is generated in step S305. Note that the range of the value random number a can assume is set to be smaller than N and, more particularly, this range is preferably experimentally set. Subsequently, it is checked in step S306 if variable j of the horizontal address counter is larger than random number a. If YES in step S306, the flow advances to step S307 to check if the pattern in a window that refers to a plurality of already binarized pixels matches a pattern set in advance (to be referred to as a target pattern hereinafter). If the two patterns match, a quantization value Q="1" is output in step S308; otherwise, a quantization value Q="0" is output in step S309.

Figures 4A, 4B:
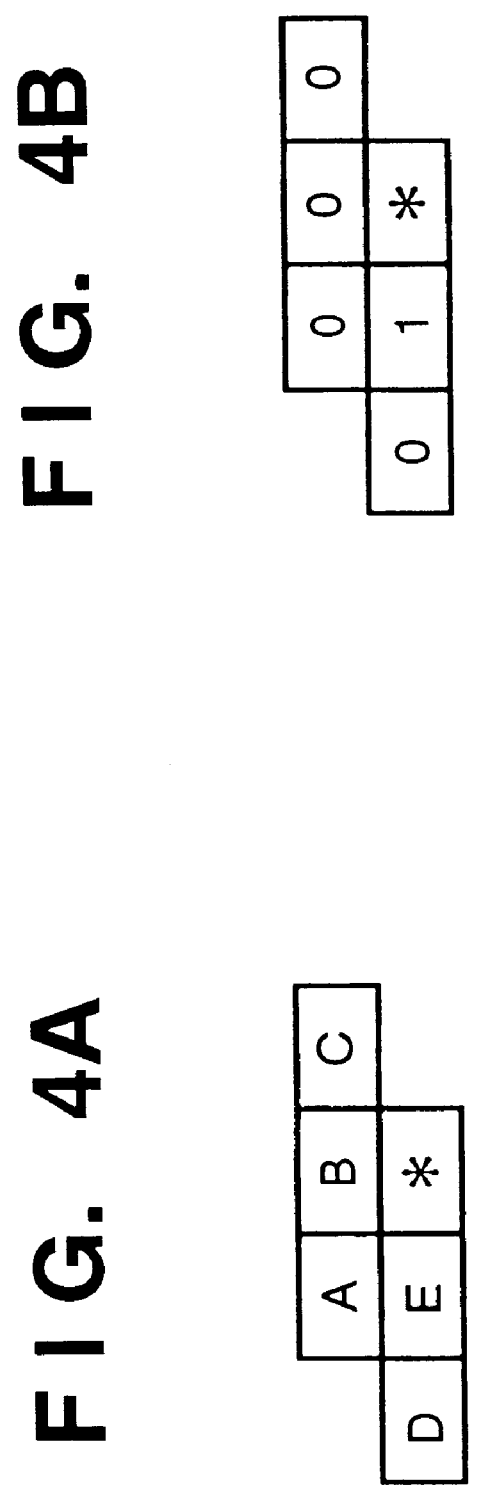

FIGS. 4A and 4B show an example of the target pattern in this embodiment. FIG. 4A shows a pixel layout in a given block of the image information, i.e., the window, * indicates the pixel of interest, and pixels A, B, C, D, and E are those which have already undergone final binarization. FIG. 4B shows a target pattern example. If pixels A to E in the window shown in FIG. 4A assume values in the target pattern, it is determined that the pattern in the window matches the target pattern. In the example shown in FIGS. 4A and 4B, since there are five pixels to be referred to, combinations for 5 bits are available as patterns of the reference pixels. The actual pattern of quantization values around the pixel of interest is one of the combinations for 5 bits, and it is checked in step S307 above if the surrounding pixel pattern is equal to the target pattern set in advance.

The value of variable j is counted up in step S310 to shift the horizontal address by one column. It is checked in step S311 if variable j is smaller than M. If the processes have been done for M horizontal pixels, variable i for the vertical direction is counted up in step S312. It is checked based on variable i in step S313 if the processes have been done for N lines. If NO in step S313, the flow returns to step S302 to repeat a series of processes.

In the flow chart shown in FIG. 3, both quantization values Q="0" and "1" are output for the sake of simplicity. However, this embodiment can also be implemented as follows. That is, since cases of "Q=1" at which a code is embedded are considerably fewer than those of "Q=0", "Q=0" may be set as a default quantization value, and a switching signal may be sent for a pixel corresponding to "Q=1".

The quantization value determination unit 104 will be described below. The quantization value determination unit 104 comprises a simple OR gate. Hence, a pixel which is quantized to "1" as the quantization result of either the pseudo halftone processing unit 101 or quantization unit 103 is finally output as "1". More specifically, a new quantization value "1" is appended to only a pixel in which a code "1" is embedded by the quantization unit 103 in addition to pixels that have undergone pseudo halftoning. Appending of the quantization value amounts to embedding of a code of additional information in this embodiment.

Figures 5, 6:
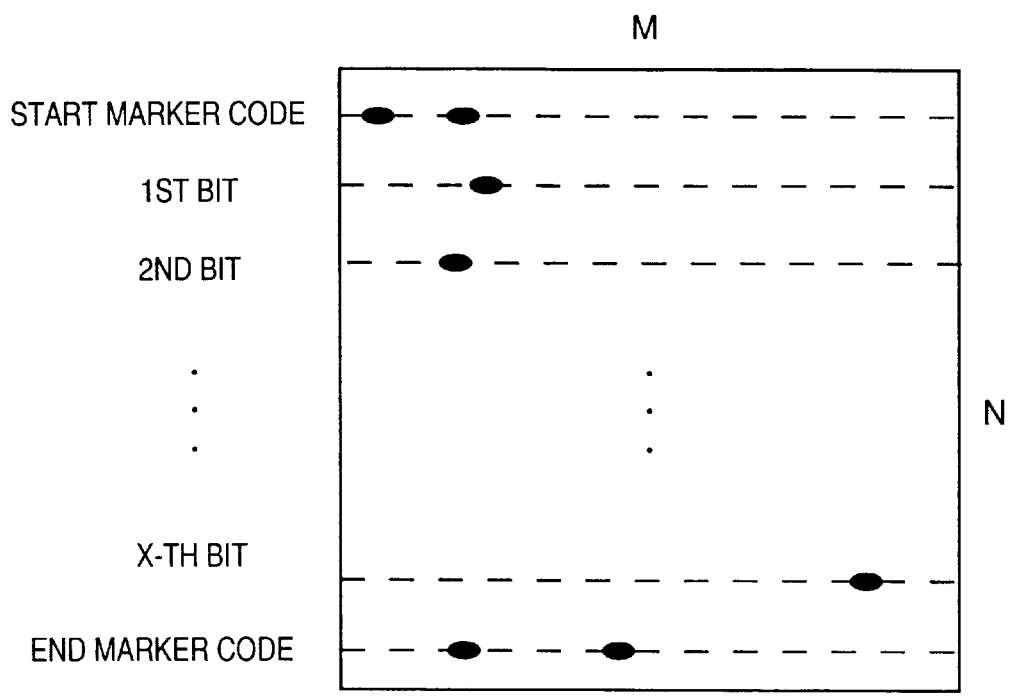
FIG. 5 shows an example of a block on which a code is multiplexed in the first embodiment.
FIG. 6 shows an example of a diffusion matrix in error diffusion.

FIG. 5 shows a state wherein codes are multiplexed in a block. Assume that the broken lines in FIG. 5 indicate those in which codes are to be embedded. By embedding a plurality of codes in a single line, they indicate marker codes which serve as the start and end codes of the block.

After a line in which a start marker code is embedded, codes of all x bits from the first to x-th bits are embedded in fixed lines. As described above, information indicating lines used in embedding must be recognized by both the encoder and decoder sides. An end marker code is embedded at the end of the block. Note that either the start or end marker code can be omitted. More specifically, the decoder side can detect a region in which the codes are multiplexed.

In this embodiment, a random number is used in the column direction. However, the present invention is not limited to such specific example, and a random number may be used in the line direction. That is, the decoder side must accurately recognize the embedded positions by regularly determining the code embedded positions in at least one direction or providing a key that specifies the embedded positions.

The arrangement that implements the multiplexing process of this embodiment has been described. The gist of this embodiment lies in that a texture which cannot normally be generated by pseudo halftoning is artificially generated by a combination of quantization values, and a 1-bit code is expressed by the presence/absence of that texture. That is, this embodiment is characterized in that the pixel of interest is quantized to "1" upon detecting the target pattern shown in FIG. 4B in an image, thus artificially generating a texture of a run of "1"s.

In general, error diffusion is known as a quantization method that generates a very unique texture. Conventionally, generation of a chain-like texture that the observer visually finds disturbing is a serious problem of error diffusion. For this reason, many proposals for preventing such disturbing texture have been made.

However, upon analyzing the generation factors of a texture, texture patterns include those that can be generated, and those that cannot be generated. For example, if a diffusion matrix shown in FIG. 6 is used as the error distribution table 204, when a pixel immediately before the pixel of interest indicated by * is quantized to "1", since a negative quantization error is generated, it becomes harder to quantize the neighboring pixel of interest to "1". Therefore, upon decoding codes appended by this embodiment, if a highlight (low-density range) solid portion can be detected, since a quantization value pattern in which both the horizontally neighboring pixels assume "1" cannot be normally generated, that pattern can be recognized as a code if it is detected.

Note that a texture formed by successively printing dots hardly stands out even when it is printed by an ink-jet printer having a resolution as low as about 360 dpi on a recording sheet, and does not impose any visual disturbance on the naked eye. However, when the texture on the recording sheet is observed using a magnifying glass, successively printed dots can be clearly detected. Hence, in this embodiment, the embedded codes can be easily decoded without using any expensive reader such as a high-resolution image scanner. That is, if only the magnifying glass and a measuring device that can measure the distance (the number of pixels) between the embedded codes (textures) are available, the embedded codes can be easily decoded.

In this manner, codes can be visually naturally embedded as long as a texture that may be formed on the recording sheet can be arbitrarily controlled. This is because the frequency characteristics of error diffusion do not have any peak at a given fixed frequency but serve as a broad-band high-pass filter.

By contrast, it is difficult to arbitrarily control texture in ordered dithering in which process is regularly repeated at short periods. Since ordered dithering has very large electric power at a fixed frequency based on a dither period, if information is embedded in a frequency range other than the peak frequency, the observer visually experiences incongruence, resulting in deterioration of image quality.

As described above, in general, both the neighboring pixels never assume "1" in a highlight solid portion. For this reason, the code embedded as successive dots in this embodiment can be decoded in at least the highlight solid portion. Since this embodiment has as its object to prevent securities such as banknotes, revenue stamps, and the like from being forged, a target image always includes a highlight solid portion. In color information such as YMCK information or the like, one of four colors separated into color components is highly likely to be a highlight solid portion as a result of a process such as UCR (undercolor removal) or the like. Hence, this embodiment can sufficiently achieve that object.

A texture in a highlight solid portion has been exemplified. Also, in, e.g., a solid portion of a high-density portion other than the highlight portion, an arbitrary code can be embedded by generating a texture which is not easily generated in that density range. More specifically, the decoder side need only recognize and decode a texture pattern which is not easily generated in a density range it can discriminate as a code.

In this embodiment, the code embedding method in one block has been explained. It is preferable to repetitively embed codes over the entire image using that block as one unit. When codes are embedded over the entire image, even when codes cannot be decoded in a given block of an image, codes can be easily decoded in some other blocks.

As described above, according to this embodiment, since a code is expressed by a texture which is not easily generated in a solid portion of an image, additional information can be multiplexed onto image information while suppressing deterioration of image quality. Also, multiplexed additional information can be easily decoded without using any expensive, precision device.

The second embodiment of the present invention will be described below.

Since a schematic arrangement of a multiplexer in the second embodiment is substantially the same as that shown in FIG. 1 of the aforementioned first embodiment, except for the process in the quantization unit 103, a detailed description thereof will be omitted.

The quantization process in the second embodiment will be described in detail below with reference to the flow chart shown in FIG. 7. In the following description, assume that the quantization value is assumed to be a binary value and additional information is embedded in a block consisting of N=M pixels in image information as in the first embodiment. Note that the information size to be embedded in one line in the block is 1 bit. Also, the same step numbers denote the same processes as those in the flow chart shown in FIG. 3 described in the first embodiment, and a detailed description thereof will be omitted.

In the quantization process in the second embodiment, if it is determined in step S303 that the code to be embedded is "1", pattern A which is registered in advance is set as a target pattern in step S701; if it is determined in step S303 that the code is "0", pattern B which is registered in advance is set as a target pattern in step S706. The subsequent processes are the same as those in the first embodiment.

Figure 7:
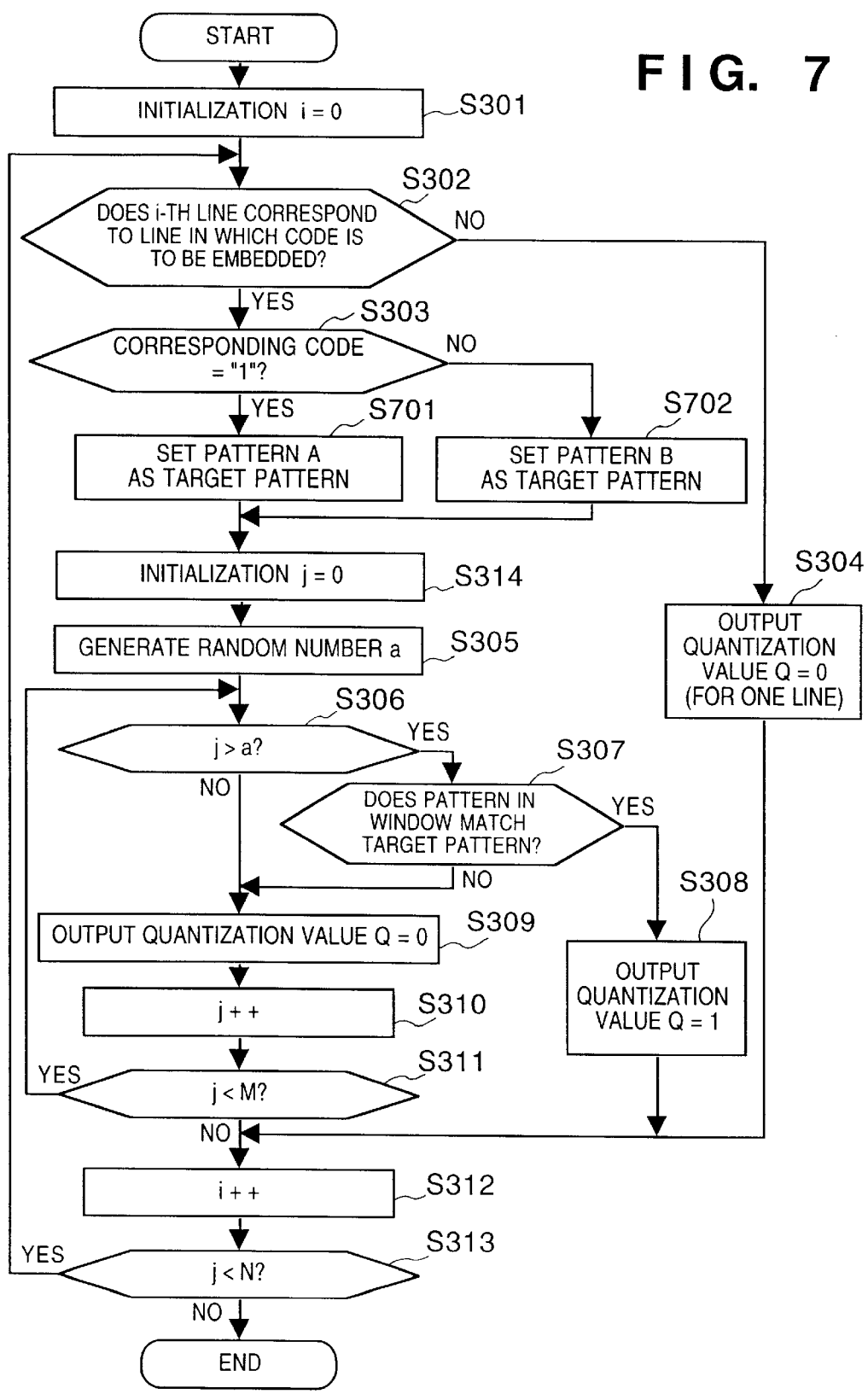
FIG. 7 is a flow chart showing a quantization process according to the second embodiment of the present invention.

In the flow chart shown in FIG. 7 as well, both quantization values Q="0" and "1" are output for the sake of simplicity. However, since cases of "Q=1" at which a code is embedded are considerably fewer than those of "Q=0", "Q=0" may be set as a default quantization value, and a switching signal may be sent for a pixel corresponding to "Q=1".

Figures 8A, 8B, 8C:
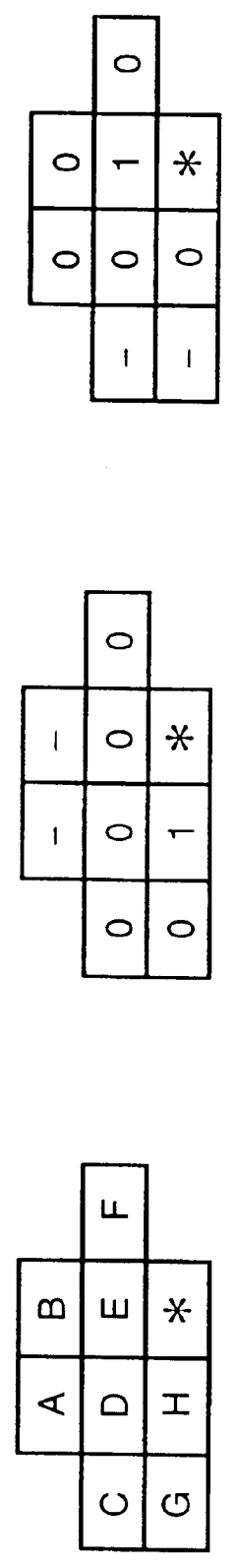

FIGS. 8A to 8C show example of patterns A and B set as the target pattern in the second embodiment. FIG. 8A shows a pixel layout in the window, * indicates the pixel of interest, and pixels A to H are surrounding pixels which have already undergone final binarization, and have combinations of values for 8 bits. FIGS. 8B and 8C respectively show the examples of patterns A and B, and values of pixels at positions indicated by "−" can be any values.

As can be seen from FIGS. 8A to 8C, pattern A is characterized by having a quantization value=1 at a pixel immediately preceding the pixel of interest in the horizontal direction, and pattern B is characterized by having a quantization value=1 at a pixel immediately preceding the pixel of interest in the vertical direction. Hence, if the pixel layout of pattern A is detected in the block, a horizontally successive quantized pattern is formed; if that of pattern B is detected, a vertically successive quantized pattern is formed.

In the second embodiment, upon embedding a code of additional information, quantization value Q="1" is set at "1" not only when the code is "1" but also when it is "0". That is, upon embedding codes, all quantization values Q are set at "1".

The decoder side can determine based on the pattern difference if the embedded code is "1" or "0". That is, the first embodiment mentioned above embeds 1-bit information by the presence/absence of a texture, as shown in FIG. 3, while the second embodiment embeds a code by changing the pattern of a texture to be generated. In the example shown in FIGS. 8A to 8C, a pattern in which "1"s successively appear horizontally is set as a code "1", and a pattern in which "1"s successively appear vertically is set as a code "0".

Note that the decoder side should recognize and decode a highlight solid portion or a solid portion of a high-density portion as in the first embodiment described above.

In the second embodiment, embedding of 1-bit information using two different target patterns has been exemplified. Also, by setting two or more different target patterns, more codes can be embedded.

As described above, according to the second embodiment, since a plurality of codes are expressed by a plurality of textures which are not easily generated in a solid portion of an image, a larger number of additional information can be multiplexed on image information while suppressing deterioration of image quality.

The third embodiment of the present invention will be described below.

Figure 9:
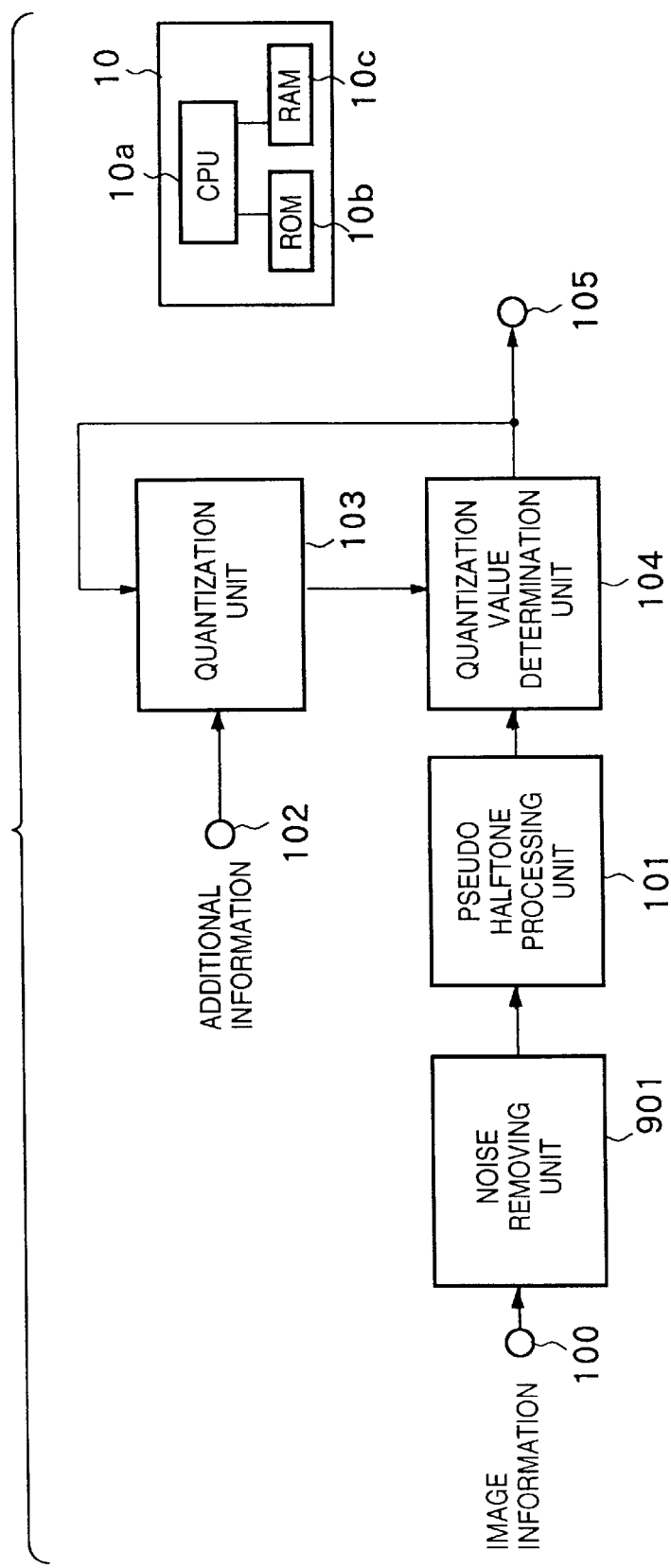
FIG. 9 is a block diagram showing a schematic arrangement of a multiplexer according to the third embodiment of the present invention.

FIG. 9 shows a schematic arrangement of a multiplexer according to the third embodiment. The same reference numerals in FIG. 9 denote the same parts as in FIG. 1 in the first embodiment described above, and a detailed description thereof will be omitted.

A characteristic feature of the third embodiment lies in that a noise removing unit 901 is inserted before the pseudo halftone processing unit 101. The noise removing unit 901 removes small noise present in an image using a filter. The noise removal method is not particularly limited. For example, a window may be formed by pixels that surround the pixel of interest, and if only the pixel of interest has a pixel value different from those of the surrounding pixels, it may be determined as noise, and the pixel value of the pixel of interest may be changed. In addition, other known methods may be used.

Note that the quantization method in the quantization unit 103 can be based on the operation sequence shown in the flow chart of FIG. 3 or 7 in the first or second embodiment described above.

As in the first and second embodiments described above, the third embodiment embeds a code in an image as a texture pattern, and the decoder side decodes information by detecting the embedded code. That is, as a pattern to be artificially generated, a pattern which is not easily generated in a corresponding density range by the pseudo halftone process alone is required.

As has been described in the first embodiment, a value "1" is not easily generated for two successive pixels in a highlight solid portion. However, when noise is included in an image, and the decoder side detects a pattern of successive "1"s, it can hardly determine if the detected pattern is generated by noise or by artificially embedding a code.

To solve this problem, the third embodiment removes all noise components in units of pixels before the pseudo halftone process, so as to avoid an image mixed with noise from being output. With this process, a pattern generated by noise can be prevented from being erroneously determined as an artificial pattern. Also, the degree of freedom in generation of an artificial pattern improves. That is, since noise components are removed, the number of types of textures generated by error diffusion decreases, and the number of texture patterns that can be artificially generated can relatively increase.

Note that a low-pass filter may be connected in place of the noise removing unit 901. However, if an image is changed too much by filtering before the pseudo halftone process, such change considerably influences image quality. Hence, an optimal filter is preferably selected by experiments.

Note that the third embodiment is not suitable for an artificially created character/line image. For example, in a character/line image scanned by, e.g., an image scanner or the like, its edge becomes blunt due to MTF of the input device, and the middle density is generated. For this reason, the noise removing unit 901 can be inserted before the pseudo halftone processing unit 101. However, in a character/line image artificially created by a computer or the like, since it is difficult to distinguish if it is noise or required information, required information may be lost by the noise removing process.

Hence, to avoid the above shortcoming, the input terminal 100 receives only image information via an input device such as a scanner or the like, and artificial image information such as a character/line image, or the like is preferably input via another processing route so as not to undergo any noise removal.

As described above, according to the third embodiment, since noise is removed prior to the pseudo halftone process for image information, and additional information is then multiplexed on the image information, not only the decoder side can avoid determination errors of textures representing codes, but also a larger number of kinds of additional information can be multiplexed.

The fourth embodiment of the present invention will be described below.

Figure 10:
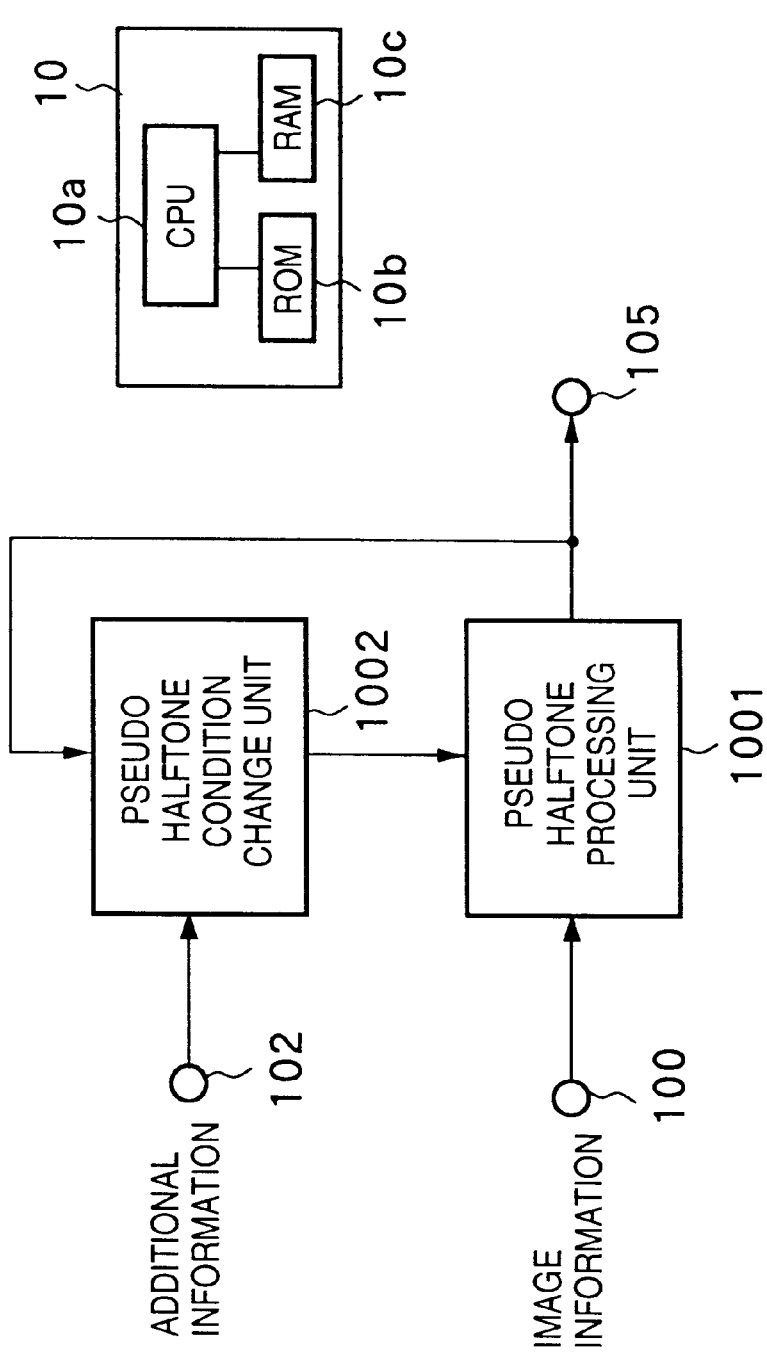
FIG. 10 is a block diagram showing a schematic arrangement of a multiplexer according to the fourth embodiment of the present invention.

FIG. 10 is a block diagram showing a schematic arrangement of a multiplexer according to the fourth embodiment. Reference numeral 100 denotes an input terminal which inputs multi-level image information. Reference numeral 1001 denotes a pseudo halftone processing unit which executes pseudo halftoning of image information input from the input terminal 100 to convert the information to quantization levels smaller than the number of input gray levels and to reproduce tone by dot area modulation using the quantization values of a plurality of pixels. This quantization result is sent to a printer engine via an output terminal 105 as a multiplexing result of additional information onto image information, and an image is formed on a recording sheet. Note that the detailed arrangement of the pseudo halftone processing unit 1001 is the same as that shown in FIG. 2 in the first embodiment.

Reference numeral 102 denotes an input terminal for inputting required additional information to be embedded in image information. The additional information may include various kinds of information that pertain to the output state upon outputting an image onto a recording sheet such as the manufacturer name, model name, machine number, and the like of an output device. Reference numeral 1002 denotes a pseudo halftone condition change unit which changes the pseudo halftone processing condition in the pseudo halftone processing unit 1001 with reference to the code of additional information and the quantization results of a plurality of pixels that have already undergone final quantization.

A characteristic feature of the fourth embodiment lies in that the pseudo halftone condition change unit 1002 changes the threshold value in the pseudo halftone process. For example, in the pseudo halftone processing unit 101 in the first embodiment described above, the threshold value for binarization, which is input to the comparator 201 (FIG. 2), is a fixed value. However, in the fourth embodiment, the threshold value to be input to the comparator 201 is dynamically changed by the pseudo halftone condition change unit 1002.

Figure 11:
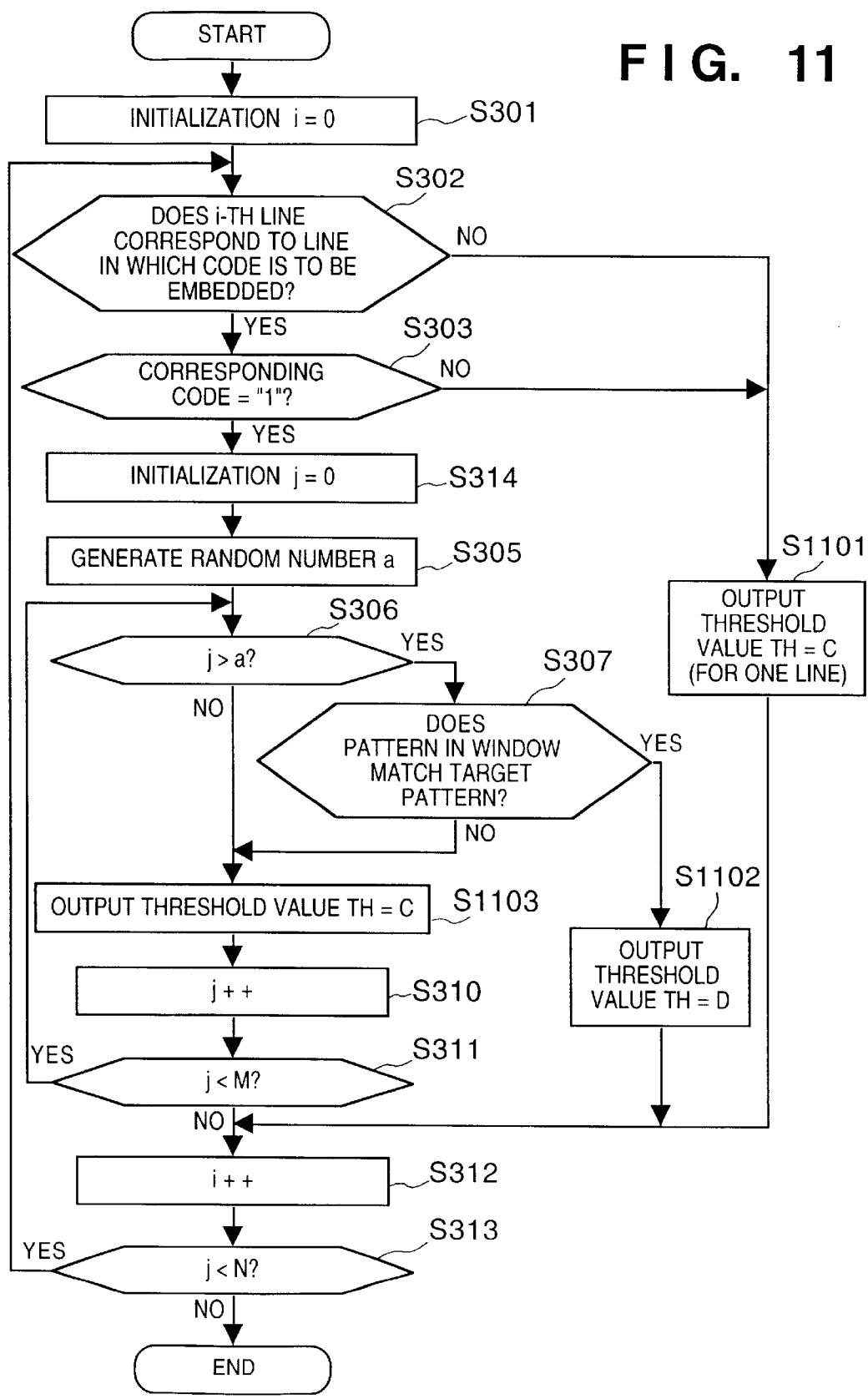
FIG. 11 is a flow chart showing a threshold value change process in the fourth embodiment.

FIG. 11 is a flow chart showing the operation sequence of the pseudo halftone condition change unit 1002. In the following description, assume that the quantization value is assumed to be a binary value and additional information is embedded in a block consisting of N×M pixels in image information as in the first embodiment. Note that the information size to be embedded in one line in the block is 1 bit. Also, the same step numbers denote the same processes as those in the flow chart shown in FIG. 3 described in the first embodiment, and a detailed description thereof will be omitted.

In the threshold value change process of the fourth embodiment, if it is determined in step S302 that the line of interest is a line in which a code is not embedded, and if it is determined in step S303 that the code to be embedded is "0", a threshold value TH=C is set and output for one line in step S1101. Since the value C is set as a threshold value of the pseudo halftone process, it is a common practice to set "0.5" as the middle value between quantization values "0" and "1". If a pixel value is expressed by 8 bits, the threshold value TH=C corresponds to "128". Of course, the threshold value is not limited to the middle value of the quantization values.

It is checked in step S306 if the value of horizontal address counter j is larger than random number a. If YES in step S306, it is checked in step S307 if the pattern in a window that refers to a plurality of already binarized pixels matches a predetermined target pattern as in the first embodiment. If YES in step S307, a threshold value TH=D is set and output in step S1102. In this case, D is set at a value that forces the pseudo halftone process to output "1".

On the other hand, if j≦a in step S306, and if the reference pattern does not match the target pattern in step S307, the flow advances to step S1103 to set and output a threshold value TH=C as in step S1101.

In the flow chart of FIG. 11, outputs are generated for both the threshold values TH=C and D for the sake of simplicity, but cases of "TH=D" that embeds a code "1" are much fewer than those of "TH=C". Hence, it is effective to set C as a default threshold value TH in the pseudo halftone processing unit 1001. More specifically, the pseudo halftone condition change unit 1002 generates a switching signal to the pseudo halftone processing unit 1001 only for a pixel corresponding to "TH=D", and the pseudo halftone processing unit 1001 executes pseudo halftoning using D as the threshold value TH only when it receives the switching signal, and can execute pseudo halftoning using C for other pixels.

As described above, according to the fourth embodiment, the threshold value TH=D is set only when a code "1" is embedded. When the pseudo halftone condition change unit 1002 changes the threshold value TH in this way, the pseudo halftone processing unit 1001 can appropriately embed additional information by executing only normal error diffusion.

Note that the quantization process in the fourth embodiment is not equivalent to that in the first embodiment. In the first embodiment, the quantization value of a pixel in which a code is to be embedded is forcibly set at "1", and this setup is made irrespective of the value of the pixel of interest. That is, since the quantization value determination unit 104 forcibly sets a quantization value after error diffusion by the pseudo halftone processing unit 101, any quantization error upon setting the quantization value="1" is not diffused. Strictly speaking, the pixel value is not preserved. In addition, since "1" is added to a pixel position which is normally quantized to "0", the density locally increases, and that pixel is visually readily detectable.

By contrast, in the fourth embodiment, the quantization value of a pixel in which a code is to be embedded is forcibly set at "1" as in the first embodiment, but since only the threshold value of the pseudo halftone process is changed, the pixel value of the pixel of interest is preserved. That is, since the quantization value of the pixel in which a code is to be embedded is set at "1", a still larger negative quantization error is accumulated in the pseudo halftone processing unit 1001. For this reason, a blank state in which quantization values "0" successively appear is generated in surrounding pixels after the code is embedded, and the density is locally preserved.

In the fourth embodiment as well, it is effective to insert the noise removing unit described in the third embodiment before the pseudo halftone processing unit 1001.

As described above, according to the fourth embodiment, since the threshold value to be referred to in the pseudo halftone process is controlled, a code can be multiplexed while preserving the local density.

The fifth embodiment of the present invention will be described below.

Figure 12:
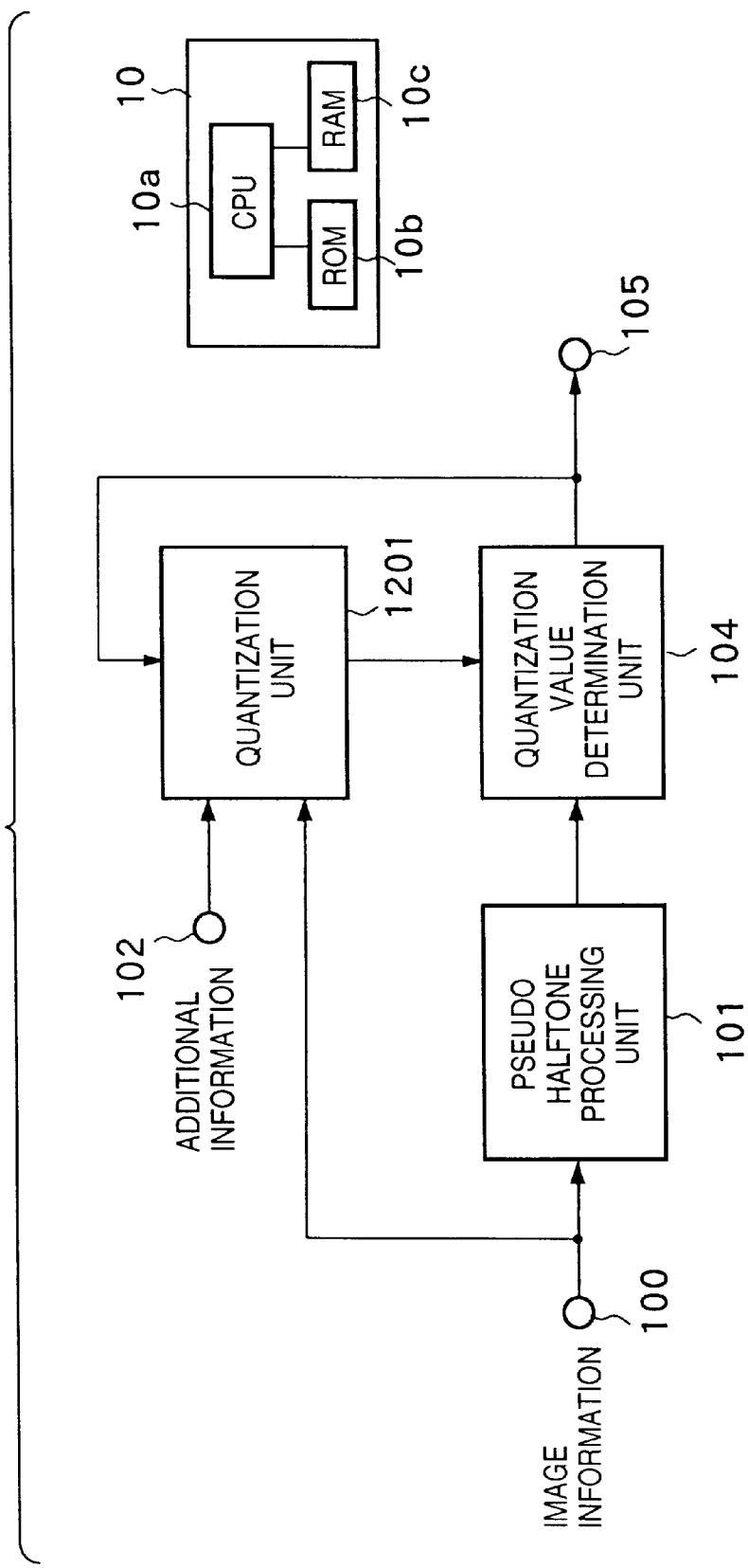
FIG. 12 is a block diagram showing a schematic arrangement of a multiplexer according to the fifth embodiment of the present invention.

FIG. 12 shows a schematic arrangement of a multiplexer according to the fifth embodiment. The same reference numerals in FIG. 12 denote the same parts as those in FIG. 1 in the first embodiment, and a detailed description thereof will be omitted. Referring to FIG. 12, reference numeral 1201 denotes a quantization unit for computing the quantization value of the pixel of interest with reference to the code of additional information and the quantization results of a plurality of pixels which have already been finally quantized.

The fifth embodiment is characterized in that the pixel of interest before the pseudo halftone process and its surrounding pixel values are input to the quantization unit 1201.

In the first to fourth embodiments described above, a texture which is not easily generated in a corresponding density range is generated as an artificial texture pattern, and is multiplexed. This multiplexing method is premised on that a block of image information, which serves as one unit of a code to be multiplexed is a solid portion having a uniform density. More specifically, the aforementioned multiplexing method is effective for a solid portion of an image. However, in practice, a block of image information often includes an edge or a plurality of density ranges.

The fifth embodiment is largely different from the above embodiments in that the pattern to be generated is dynamically changed. That is, the quantization unit 1201 detects the densities of pixels around the pixel of interest, sets a pattern that is not easily generated at those densities as a target pattern, and embeds a code by artificially generating the target pattern.

As the target pattern set in the fifth embodiment, the number of gray levels that can be expressed are grouped into a plurality of density ranges, and target patterns in units of density ranges are preferably held in advance as a table.

Also, when the pixel of interest corresponds to an edge portion, it may be determined that a code is hard to embed, and the quantization result may be forcibly set at "0" to achieve high-speed processes.

Note that the decoder side must detect the image density, and detect the target pattern in correspondence with the density. Hence, when the table is used upon multiplexing, it is effective to use a similar table upon decoding.

In the fifth embodiment, the target pattern is set in correspondence with the image density. For example, it is effective to combine the fifth embodiment with the fourth embodiment. More specifically, when the quantization threshold value is set in correspondence with the image density, the same effect as that obtained upon switching the target pattern is obtained in practice.

As described above, according to the fifth embodiment, since the target pattern of a code is varied in accordance with the density of image information, a code can be appropriately multiplexed even in a portion other than a solid portion of an image.

The sixth embodiment of the present invention will be described below.

Figure 13:
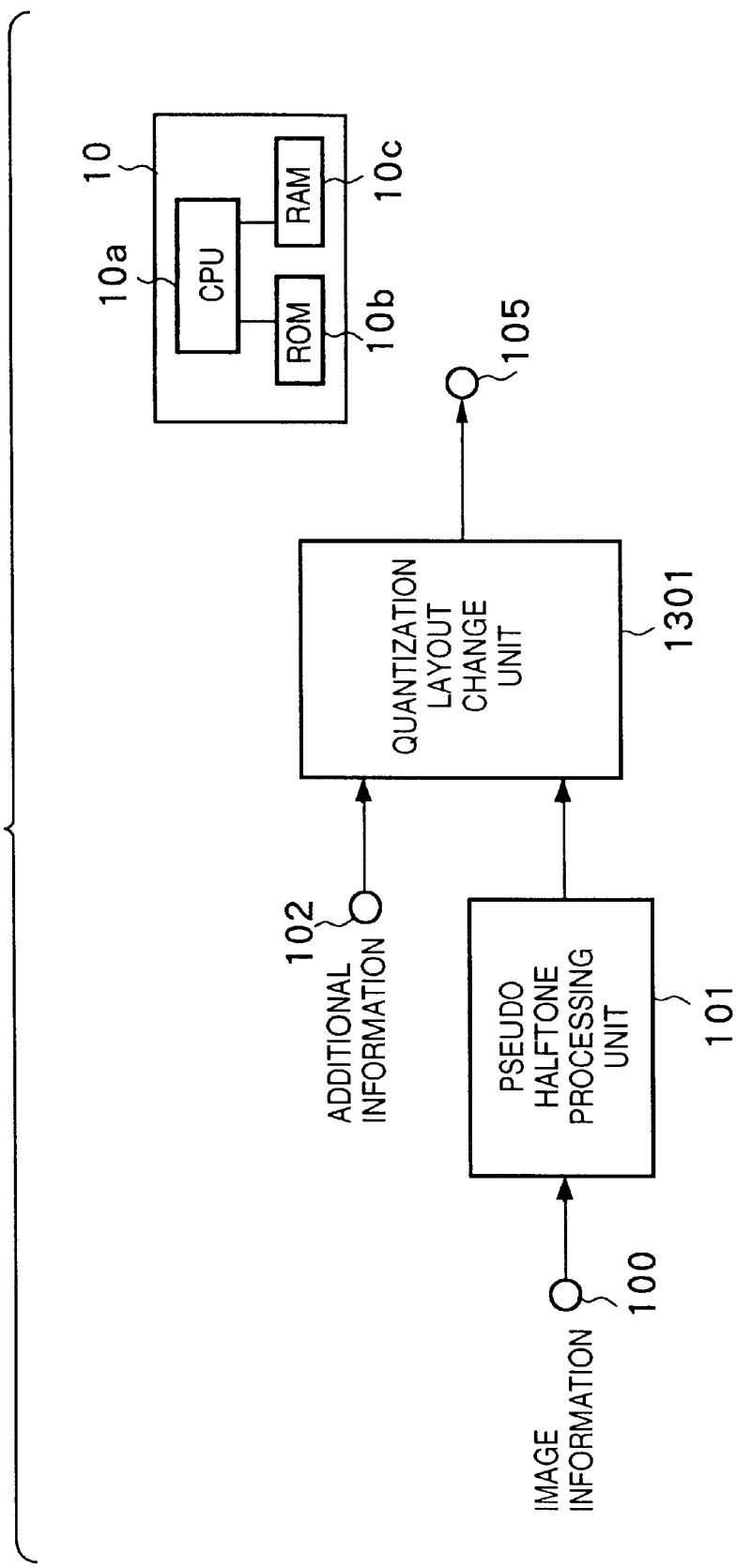
FIG. 13 is a block diagram showing a schematic arrangement of a multiplexer according to the sixth embodiment of the present invention.

FIG. 13 shows a schematic arrangement of a multiplexer according to the sixth embodiment. The same reference numerals in FIG. 13 denote the same parts as those in FIG. 1 in the first embodiment, and a detailed description thereof will be omitted. Referring to FIG. 13, reference numeral 1301 denotes a quantization layout change unit for changing the layout of quantization values that have already undergo the pseudo halftone process, on the basis of quantization values around the pixel of interest after the pseudo halftone process, and input additional information.

Figure 14:
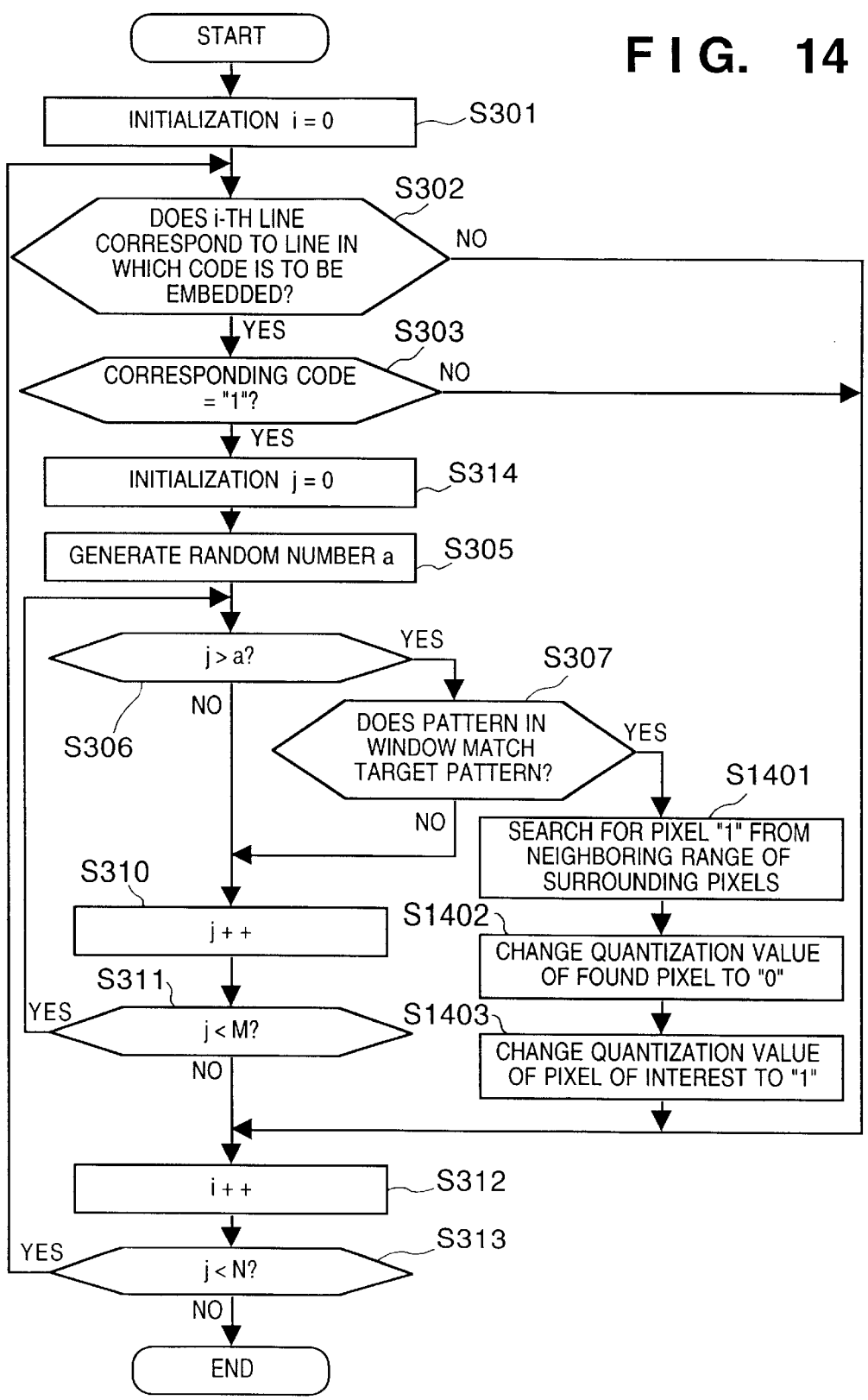
FIG. 14 is a flow chart showing a quantization process in the sixth embodiment.

FIG. 14 is a flow chart showing the operation sequence in the quantization layout change unit 1301, i.e., the quantization process in the sixth embodiment. In the following description, assume that the quantization value is assumed to be a binary value and additional information is embedded in a block consisting of N×M pixels in image information as in the first embodiment. Note that the information size to be embedded in one line in the block is 1 bit. Also, the same step numbers denote the same processes as those in the flow chart shown in FIG. 3 described in the first embodiment, and a detailed description thereof will be omitted.

In the quantization process in the sixth embodiment, if it is determined in step S302 that the line of interest is a line in which a code is not embedded, and if it is determined in step S303 that the code to be embedded is "0", the flow jumps to step S312 to start the process for the next line. That is, in the currently processing line, the layout of already quantized pixels remains the same.

It is checked in step S306 if the value of horizontal address counter j is larger than random number a. If YES in step S306, it is checked in step S307 if the pattern in a window that refers to a plurality of already binarized pixels matches a predetermined target pattern as in the first embodiment. If YES in step S307, the neighboring range of surrounding pixels is searched to find a pixel quantized to "1" in step S1401. This search is made within a predetermined range in turn from a pixel closer to the pixel of interest. Note that pixels corresponding to neighboring "1"s present in the target pattern are excluded from search targets. Note that the search range must be smaller than the spacing of lines in which codes are embedded.

The quantization value of the found pixel is changed from "1" to "0" in step S1402, and the quantization value of the pixel of interest is conversely changed from "0" to "1" in step S1403. That is, in steps S1402 and 1403, the layout of quantization values of the pixel of interest and surrounding pixels is changed. After the layout of quantization values is changed, the flow advances to step S312 to count up vertical address counter i, thus starting the process for the next line.

On the other hand, if j≦a in step S306, and if the reference pattern does not match the target pattern in step S307, the flow advances to step S310 to count up horizontal address counter j.

In the sixth embodiment, since an artificial texture pattern is generated by the aforementioned quantization value layout change process, a 1-bit code or equivalence of additional information is embedded in image information.

The sixth embodiment is characterized in that a code is embedded by changing only the pixel layout without changing the density value itself. Note that the quantization layout change process may be done synchronously or asynchronously with error diffusion.

Figure 15A:
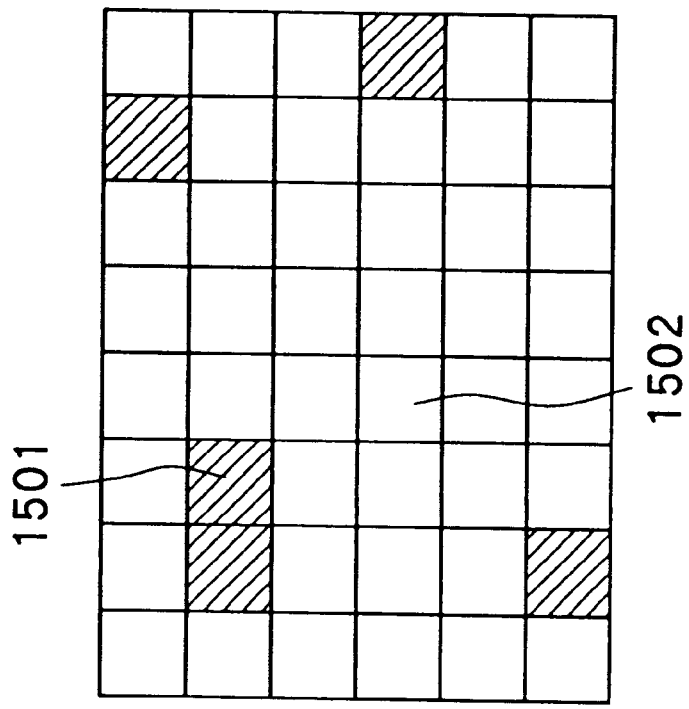
FIGS. 15A and 15B show example of changes in quantization pattern in the sixth embodiment.
Figure 15B:
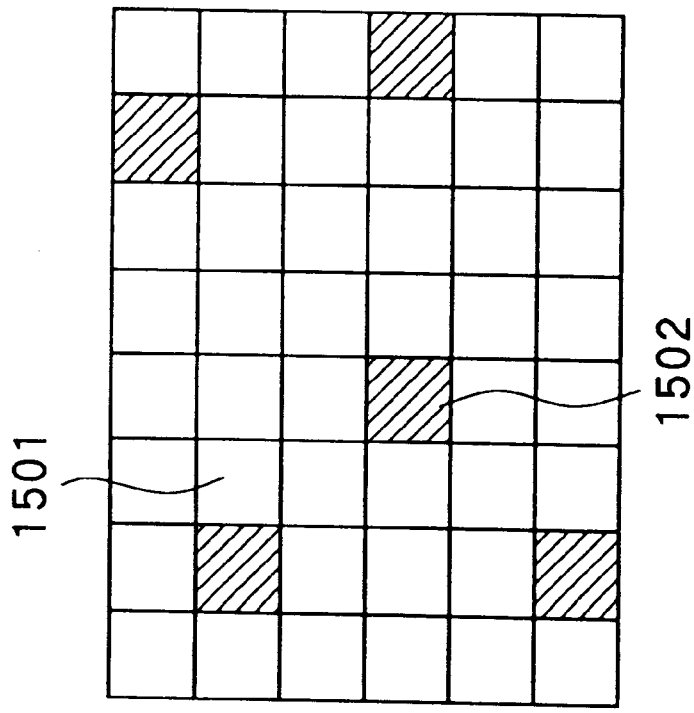
Figure 16:
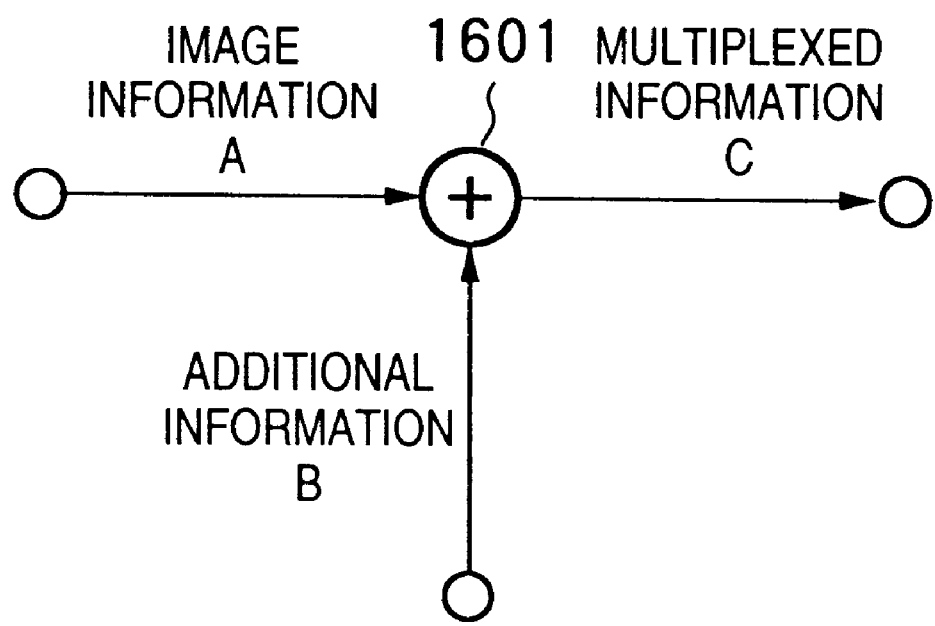
FIG. 16 is a block diagram showing an example of a conventional multiplexing process.
Figure 17:
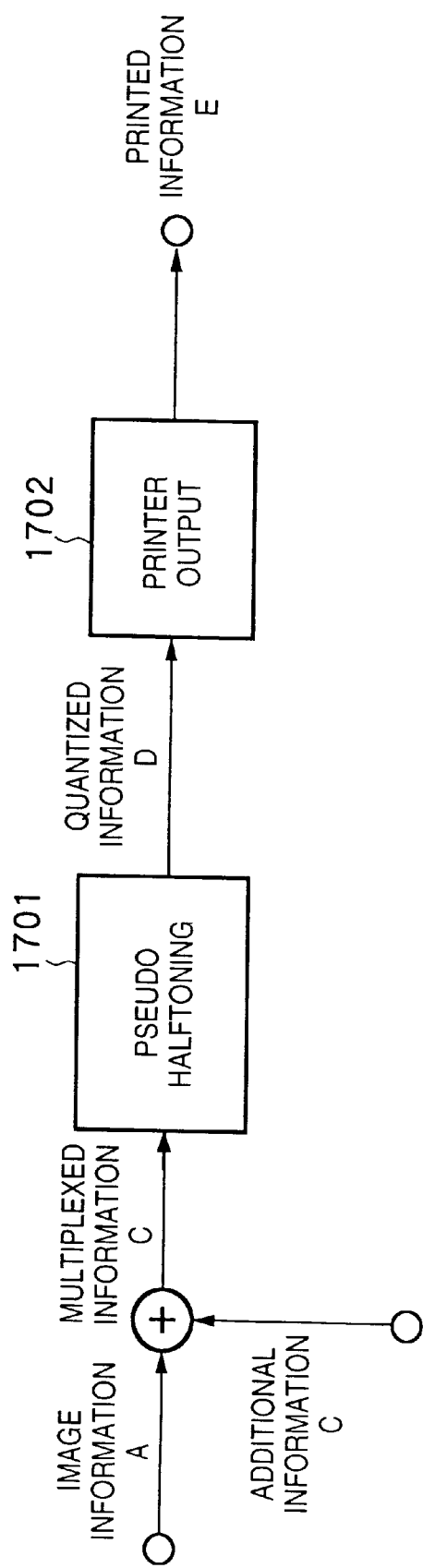
FIG. 17 is a block diagram showing another example of the conventional multiplexing process.

FIGS. 15A and 15B show a state wherein the quantization layout is changed in the sixth embodiment. FIG. 15A shows the output from the pseudo halftone processing unit 101, i.e., the state of quantization values after the error diffusion process, and FIG. 15B shows the output from the quantization layout change unit 1301, i.e., the state of quantization values after the layout has been changed. In FIGS. 15A and 15B, hatched cells indicate pixels with a quantization value= "1", and reference numeral 1501 denotes the pixel of interest. Also, the search range is set to include, e.g., 24 pixels in the vicinity of the pixel of interest (5×5 pixels having the pixel of interest as the center).

According to FIGS. 15A and 15B, the same effect as that obtained by moving a pixel 1502 which has a value "1" in the search range to the position of the pixel 1501 of interest by changing the quantization layout is obtained.

As described above, according to the sixth embodiment, additional information can be multiplexed by generating a predetermined texture by changing the layout of pixel values without changing the pixel values themselves.

The first to sixth embodiments have been explained, and it is also effective to appropriately combine these embodiments.

Each of the above embodiments has exemplified two gray levels (the quantization value assumes "0" or "1"), but the present invention is also effective for a larger number of gray levels. In the above embodiments, a 1-bit code is embedded per line of a block, but the present invention is not limited to this. In the above embodiments, a position where a code is to be embedded in one line is controlled using a random number. However, the present invention is not limited to such specific example. For example, a position where a code is to be embedded in one line may be set in advance, and such positions may be set regularly.

When additional information is multiplexed on color image information such as YMCK information or the like, a multiplexing process need not be done for all the color components (for example, it may be done for only a yellow component in which the resolving power visually deteriorates).

In the above embodiments, error diffusion is used as the pseudo halftone process. However, the present invention is not limited to error diffusion, and may be implemented by dithering using blue noise having the same frequency characteristics as those of error diffusion, or a method that combines error diffusion and an average density method (Japanese Patent Laid-Open No. 2-210961).

The type of additional information is not limited to information that pertains to the output state of image information, and for example, audio information or the like may be used.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the flow charts shown in FIGS. 3, 7, 11, 14, and the like.

To recapitulate, according to the present invention, since texture generation as a principle of error diffusion is used to embed codes, additional information can be multiplexed on image information while suppressing deterioration of image quality, and the multiplexed additional information can be easily decoded.

Hence, forgery of securities and infringement of copyright can be prevented.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for multiplexing additional information onto image information, comprising:
   quantization means for quantizing a pixel of interest of the image information by a pseudo halftone process based on error diffusion; and
   control means for controlling a quantization value of the pixel of interest with quantization values of a plurality of pixels, including the pixel of interest, forming a specific pattern indicating the additional information,
   wherein said control means comprises:
      additional information quantization means for setting the quantization value of the pixel of interest on the basis of surrounding pixels, which have already been quantized by said quantization means, the additional information, and pixel values around the pixel of interest before quantization by said quantization means; and
      determination means for determining the quantization value of the pixel of interest on the basis of quantization results of said quantization means and said additional information quantization means.

2. The apparatus according to claim 1, wherein the specific pattern is a pattern which is not easily generated by said quantization means.

3. The apparatus according to claim 1, wherein said quantization means and said additional information quantization means make binary quantization, and
   said determination means determines the quantization value of the pixel of interest by ORing the quantization results of said quantization means and said additional information quantization means.

4. The apparatus according to claim 1, wherein said additional information quantization means quantizes the pixel of interest by multiplexing the additional information thereon when quantization values of the surrounding pixels form a predetermined pattern.

5. The apparatus according to claim 1, wherein said control means forms the specific pattern by controlling a quantization condition of said quantization means on the basis of the additional information.

6. The apparatus according to claim 5, wherein said control means forms the specific pattern by controlling a quantization condition of said quantization means further on the basis of surrounding pixels that have already been quantized by said quantization means.

7. The apparatus according to claim 5, wherein said control means controls a quantization threshold value in the pseudo halftone process executed by said quantization means.

8. The apparatus according to claim 5, wherein said control means controls the quantization condition of said quantization means with reference to pixel values around the pixel of interest before being quantized by said quantization means.

9. The apparatus according to claim 1, wherein said control means forms the specific pattern by controlling a layout of the pixel of interest and surrounding pixels quantized by said quantization means, on the basis of the additional information.

10. The apparatus according to claim 9, wherein said control means controls the pixel layout after quantization with reference to pixel values around the pixel of interest before being quantized by said quantization means.

11. The apparatus according to claim 1, wherein said control means forms a plurality of types of specific patterns.

12. The apparatus according to claim 1, wherein said control means controls a forming position of the specific pattern on the basis of a random number.

13. The apparatus according to claim 1, wherein said control means forms the specific pattern to have regularity in at least one of column and line directions.

14. The apparatus according to claim 1, further comprising noise removing means for removing a noise component of the image information, and
   wherein said quantization means quantizes the image information from which noise has been removed by said noise removing means.

15. An image processing method for multiplexing additional information onto image information, comprising the steps of:
   a quantization step of quantizing a pixel of interest of the image information by a pseudo halftone process based on error diffusion; and
   a control step of controlling a quantization value of the pixel of interest with quantization values of a plurality of pixels, including the pixel of interest, forming a specific pattern indicating the additional information, wherein said control step comprises:
an additional information quantization step of setting the quantization value of the pixel of interest on the basis of surrounding pixels, which have already been quantized by said quantization step, the additional information, and pixel values around the pixel of interest before quantization by said quantization step; and
a determination step of determining the quantization value of the pixel of interest on the basis of quantization results of said quantization step and said additional information quantization step.

16. A storage medium which stores a program code of an image process for multiplexing additional information onto image information, said program code comprising the steps of:
a quantization step of quantizing a pixel of interest of the image information by a pseudo halftone process based on error diffusion; and
a control step of controlling a quantization value of the pixel of interest with quantization values of a plurality of pixels, including the pixel of interest, forming a specific pattern indicating the additional information,
wherein said control step comprises:
an additional information quantization step of setting the quantization value of the pixel of interest on the basis of surrounding pixels, which have already been quantized by said quantization step, the additional information, and pixel values around the pixel of interest before quantization by said quantization step; and
a determination step of determining the quantization value of the pixel of interest on the basis of quantization results of said quantization step and said additional information quantization step.

17. An image processing apparatus for multiplexing additional information onto image information, comprising:
quantization means for quantizing a pixel of interest of the image information by a pseudo halftone process; and
control means for controlling a quantization value of the pixel of interest with quantization values of a plurality of pixels, including the pixel of interest, forming a specific pattern indicating the additional information,
wherein said control means comprises:
additional information quantization means for setting the quantization value of the pixel of interest on the basis of surrounding pixels, which have already been quantized by said quantization means, the additional information, and pixel values around the pixel of interest before quantization by said quantization means; and
determination means for determining the quantization value of the pixel of interest on the basis of quantization results of said quantization means and said additional information quantization means.

18. An image processing method for multiplexing additional information onto image information, comprising the steps of:
a quantization step of quantizing a pixel of interest of the image information by a pseudo halftone process; and
a control step of controlling a quantization value of the pixel of interest with quantization values of a plurality of pixels, including the pixel of interest forming a specific pattern indicating the additional information,
wherein said control step comprises:
an additional information quantization step of setting the quantization value of the pixel of interest on the basis of surrounding pixels, which have already been quantized by said quantization step, the additional information, and pixel values around the pixel of interest before quantization by said quantization step; and
a determination step of determining the quantization value of the pixel of interest on the basis of quantization results of said quantization step and said additional information quantization step.

19. A storage medium which stores a program code of an image process for multiplexing additional information onto image information, said program code comprising the steps of:
a quantization step of quantizing a pixel of interest of the image information by a pseudo halftone process; and
a control step of controlling a quantization value of the pixel of interest with quantization values of a plurality of pixels, including the pixel of interest, forming a specific pattern indicating the additional information,
wherein said control step comprises:
an additional information quantization step of setting the quantization value of the pixel of interest on the basis of surrounding pixels, which have already been quantized by said quantization step, the additional information, and pixel values around the pixel of interest before quantization by said quantization step; and
a determination step of determining the quantization value of the pixel of interest on the basis of quantization results of said quantization step and said additional information quantization step.

* * * * *